United States Patent
Pors et al.

(10) Patent No.: US 8,425,804 B2
(45) Date of Patent: Apr. 23, 2013

(54) PROCESS FOR EVAPORATING A LIQUID FUEL AND A MIXING CHAMBER FOR PERFORMING THIS PROCESS

(75) Inventors: Zdenek Pors, Baden (CH); Andreas Tschauder, Westerkappeln (DE); Joachim Pasel, Juelich (DE); Ralf Peters, Wuerselen (DE); Detlef Stolten, Aachen (DE)

(73) Assignee: Forschungszentrum Juelich GmbH, Juelich (DE)

( * ) Notice: Subject to any disclaimer, the term of this patent is extended or adjusted under 35 U.S.C. 154(b) by 770 days.

(21) Appl. No.: 12/226,156

(22) PCT Filed: Mar. 24, 2007

(86) PCT No.: PCT/DE2007/000540
§ 371 (c)(1),
(2), (4) Date: Nov. 16, 2009

(87) PCT Pub. No.: WO2007/115529
PCT Pub. Date: Oct. 18, 2007

(65) Prior Publication Data
US 2010/0051873 A1    Mar. 4, 2010

(30) Foreign Application Priority Data
Apr. 11, 2006  (DE) .......................... 10 2006 016 912

(51) Int. Cl.
*C01B 31/18* (2006.01)
*C01B 3/24* (2006.01)

(52) U.S. Cl.
USPC .......................... 252/372; 423/650; 423/652

(58) Field of Classification Search ................. 252/373, 252/272, 273; 423/650, 652
See application file for complete search history.

(56) References Cited

U.S. PATENT DOCUMENTS

| | | | |
|---|---|---|---|
| 2,230,944 A * | 2/1941 | Hall | 159/4.1 |
| 5,826,422 A | 10/1998 | Koyama et al. | |
| 6,045,772 A | 4/2000 | Szydlowski et al. | |
| 2003/0070964 A1 | 4/2003 | Docter et al. | |

FOREIGN PATENT DOCUMENTS

| | | |
|---|---|---|
| DE | 198 60 308 | 8/2000 |
| EP | 1 304 310 | 4/2003 |
| EP | 1 712 771 | 10/2006 |
| WO | WO-00/10911 | 3/2000 |
| WO | WO-2006/053534 | 5/2006 |

* cited by examiner

*Primary Examiner* — Wayne Langel
(74) *Attorney, Agent, or Firm* — Jordan and Hamburg LLP

(57) ABSTRACT

A process with which a liquid fuel is evaporated completely in two stages is provided. In the first stage, the fuel is mixed with a hot primary medium and partly evaporated. In the second stage, the already evaporated fuel fraction is partly oxidized, which provides the heat for the complete evaporation of the fuel fractions which are yet to be evaporated. A fuel-air mixture for a reformer can be obtained with an advantageous embodiment of the process, in which the fuel is mixed homogeneously with oxidizing agent in the inventive evaporation. For the performance of the process, a mixing chamber is provided.

24 Claims, 1 Drawing Sheet

PROCESS FOR EVAPORATING A LIQUID FUEL AND A MIXING CHAMBER FOR PERFORMING THIS PROCESS

The invention relates to a method for evaporating a liquid fuel that is suitable in particular for producing a fuel/oxidizing agent mixture and to a mixing chamber for performing said method.

BACKGROUND OF THE INVENTION

Autothermal reforming is a very promising alternative to classic steam reforming for hydrogen production. In the reactor, an oxygen/water mixture reacts with hydrocarbon $C_nH_m$, without an external heat source, according to the following equations:

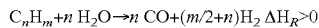

(Steam reforming)

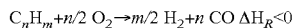

(Partial oxidation)

For methane $CH_4$ (n=1, m=4), the reaction equations are as follows:

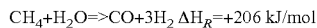

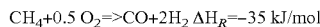

As a rule, the oxygen is provided from air. The heat that is necessary for the steam reforming is provided by partial oxidation of the hydrocarbon. Thus the process can be conducted in an autothermal operating mode. In principle there is the potential for high efficiency because system-related enthalpy losses are only possible through the warm product gas stream. Autothermal reforming appears very promising, especially for the use of fuel cell systems for a vehicle drive with gasoline or diesel fuel as the fuel. This can be attributed to the high reaction temperature (approx. 800° C.) and good reaction kinetics.

In addition to the development of suitable catalysts for autothermal reforming of middle distillates, the utility of a reformer is largely dependent on whether operating conditions can be optimized. Reforming liquid fuels places great demands on the preparation of the educts before they enter the reaction zone of the reactor, i.e. the reformer.

A poor quality educt mixture normally has a negative effect on the conversion of the fuel since carbon black and so-called "hot spots" form in the reaction zone. In order to avoid this problem it is in particular important that the $O_2$2/C ratio and $H_2O$/C ratio in the mixture remain as constant as possible and do not fluctuate. Sometimes carbon black even forms during production of the educt mixture and deposits in the mixing chamber.

The mixing chamber of a reformer therefore has the following functions:
  Supplying the fuel
  Atomizing and evaporating the fuel
  Forming the mixture (homogenizing the fuel concentration in the air/steam stream)
  Homogenizing the flow distribution (flow speed profile)

Known from WO 00/10911 is a mixing chamber in which fuel is evaporated using super-heated water steam and is mixed with air in a second area. It is disadvantageous that with such a mixing chamber it is very difficult to evaporate the high boiling components of some liquid fuels, such as diesel fuel and heating oil. If the fuel is evaporated only by directly exchanging heat with a hot gas, initially only the low boiling components evaporate. Since large quantities of energy are taken from the gas for this purpose, the gas temperature drops continuously so that it is no longer adequate for evaporating the high boiling components. Therefore it is generally not possible to completely evaporate complex fuels in this manner.

DE 198 60 308 A1 discloses a method for utilizing a fuel, in which method the so-called "cold flame" is used as a precisely defined exothermic reaction as the heat source for evaporating the liquid fuel. Disadvantageously, this method suffers from the risk of carbon black forming if a reaction occurs/ignites between the oxidant and the liquid fuel.

In U.S. Pat. No. 5,826,422 a portion of the fuel is combusted in order to generate the heat necessary for the evaporation. It is disadvantageous that carbon black also forms in this classic combustion method.

OBJECTS OF THE INVENTION

The object of the invention is therefore to provide a method for completely evaporating a complex liquid fuel without the formation of carbon black, in particular for producing a fuel/oxidizing agent mixture for a reformer. The method should also evaporate high boiling components of liquid fuels. The quality of the final product of the method should be such that no carbon black occurs, even when it is converted in a downstream reformer. The object of the invention is furthermore to provide a mixing chamber in which the method for completely evaporating a fuel can be performed, for instance for producing the fuel/oxidizing agent mixture.

These objects are attained using a method in accordance with the main claim and a mixing chamber in accordance with the collateral claim. Additional advantageous embodiments result from each of the subordinate claims that reference previous claims.

DESCRIPTION OF THE INVENTION

In the framework of the invention a method was found with which a liquid fuel can be completely evaporated even when it contains high boiling components. For instance diesel fuel and gasoline contain such high boiling components. It was found that the fuel can be evaporated in two steps, as described in the following.

Normally which components are low boiling and which are high boiling is defined differently for each fuel. In diesel fuel, components are called high boiling components if their boiling temperature is greater than 350 to 400° C. Consequently components having a boiling point of up to about 300° C. are called low boiling components.

In the first stage, the fuel is partially evaporated using heat contact with a primary medium. Any medium that has a higher temperature than the evaporation temperature of the fuel and does not enter into a chemical reaction with the fuel is suitable for the primary medium.

In a mixture of a plurality of components, the mean evaporation temperature of the mixture is considered to be its evaporation temperature.

Preferably the primary medium is superheated steam from water. As a rule between 50 and 99 percent, in particular between 70 and 90 percent, of the entire amount of fuel can be evaporated using direct heat exchange with the primary medium. If the fuel is a multicomponent mixture, such as for instance diesel fuel or gasoline, primarily the low boiling components of the fuel evaporate in the first stage; in the case of diesel fuel this is those components having a boiling temperature below 300° C. In the first stage no chemical reaction occurs between the fuel and the primary medium.

After the first sage, a secondary medium, which is in particular air, is supplied to the fuel. The secondary medium can be preheated to up to 400° C., but is preferably supplied at ambient temperature. The efficiency of the entire system is better if there is no pre-heating, and in addition there is no need for the heat exchanger that is required for the pre-heating. When the secondary medium meets the mixture of primary medium, the fuel that has already evaporated, and the fuel that has not yet evaporated, it reacts exothermally with the fuel that has already evaporated, which is already mixed with the primary medium. It is partially oxidized.

Whether the secondary medium must be pre-heated or not depends on the design of the arrangement in which the method is performed. The prevailing conditions must be suitable for igniting partial oxidation. In particular the activation energy must be available for this oxidation.

The evaporated fuel certainly oxidizes only in part and not completely. This means the fuel is involved in a reaction that releases less energy than the total combustion of the converted fuel quantity. During the partial oxidation, oxidized and non-oxidized hydrocarbons, such as for instance formaldehyde, acetaldehyde, or alcohols, as well as carbon monoxide and water, occur as reaction products. These reaction products can still be converted to a hydrogen-rich gas in the downstream reforming. In contrast, it is not possible to convert reaction products from total combustion (water and carbon dioxide) to a hydrogen-rich gas during the further reforming.

In order to cause only partial oxidation of the fuel, it is not enough to perform the oxidation under a lack of oxygen. Only a portion of the fuel is converted during oxidation under a lack of oxygen, but this portion is completely combusted. In contrast, for only partial oxidation the oxidation reaction must be interrupted, in our case upon reaching a temperature between about 500 and 600° C. This can be controlled using the temperature and the flow profile for the reaction partners and using the duration of their interaction.

The portions of the fuel that are still not evaporated do not take part in this reaction. This is because the fuel that has already been evaporated has a higher tendency to ignite than that which has not yet evaporated. If the oxidizing agent did not meet the fuel vapor, the fuel that is not evaporated would ignite, as for instance in DE 198 60 308 A1.

Due to the exothermic reaction, heat occurs that in the second stage of the method advantageously completely evaporates the portion of the fuel that is still not evaporated.

If the fuel is a multicomponent mixture, the high boiling components evaporate (in the case of diesel fuel for instance the components having a boiling temperature above 300° C.).

The critical advantage over prior art evaporation methods is that the fuel is completely evaporated and at the same time formation of carbon black is avoided. This results in a mixture of fuel vapor, water steam, and air, which is particularly suitable for reforming the fuel to create a hydrogen-rich gas. Evaporators that use the inventive method do not have to have carbon black cleaned from them regularly, such cleaning as a rule necessitating a break in operations. At the same time, due to the high quality of the mixture of the educts fuel vapor, water steam, and air, formation of carbon black is avoided even when the mixture is converted in a downstream reformer. If carbon black traveled into the reformer as an evaporation waste product or if it occurred during the conversion of the fuel vapor in the catalyst, it would block the active surface of the catalyst. Use of the aforesaid exothermic reaction improves the heat balance of the system compared to the systems that exclusively use heat exchangers to evaporate fuel. At the same time this does not cause the hydrogen yield to drop as in the systems in which a portion of the fuel is combusted.

The partial oxidation of the fuel that has already been evaporated uses some of the energy contained in the fuel. Even the high boiling components of the fuel contribute to the fuel vapor that occurs at the end of the method. According to the prior art these components were not useable, but on the contrary had to be removed from the evaporator as a waste product. Since even these components are now evaporated, the vapor produced from a given quantity of fuel using the inventive method as a rule contains just as much fuel as when there is no second stage. If a portion of the fuel combusts completely in the second stage, which is not desired, at most up to 2.5 percent of the fuel is lost. In both cases the inventive method offers the advantage that no waste products occur that must be removed from the evaporator.

The fuel is advantageously finely atomized upstream of the first stage. This can be effected for instance using an atomizing nozzle or an injector. Atomizing maximizes the surface area of the fuel, which improves the transfer of heat from the primary medium to the fuel.

Prior to coming into contact with the fuel, the primary medium advantageously has a temperature below 700° C., in particular below 500° C. This saves energy with the same evaporation capacity.

At the same time, the part of the system in which the method is performed has less of a thermal load.

The primary medium should be supplied as close as possible to the fuel injection point in order to ensure that the fuel is thoroughly mixed with the primary medium. Rotating the gas stream is also advantageous for mixing.

The secondary medium advantageously flows toward the partially evaporated fuel that has been mixed with the primary medium. This improves mixing of the fuel with the secondary medium and homogenizes the distribution of the fuel in the device in which the method is performed. This ensures that wherever there is still fuel that has not been evaporated partial oxidation is also occurring and the heat for evaporating the fuel that has not combusted is provided.

The temperature of the reaction products after the partial oxidation is advantageously 800° C. or less, in particular 450° C. or less. Because of this no more energy is used than is needed to completely evaporate the fuel and the temperature load on the environment is reduced.

In one advantageous embodiment of the invention, the first stage of the evaporation occurs in a primary evaporation zone and the second stage occurs in a secondary evaporation zone separated spatially therefrom. This ensures that the two stages do not mutually interfere with one another.

In one particularly advantageous embodiment of the invention, the fuel inventively evaporated and partially oxidized in a first area (evaporator) is mixed with an oxidizing agent in an area separated spatially therefrom. It was found that using this combination of measures it is possible to produce a homogeneous fuel/oxidizing agent mixture for a reformer, even from low-quality fuels.

Low-quality fuels shall be construed to be those fuels that contain a high proportion of high boiling components.

The oxidizing means can in particular be the same the oxidizing secondary medium used for the evaporation. However, it can also have a different oxygen content than this secondary medium. Using the oxygen content of the oxidizing agent it is possible to ensure that after the evaporation fuel and oxidizing agent are only mixed with the oxidizing agent and no longer react with it.

An area that can be defined in particular by a reaction vessel shall be construed to be a spatial region.

Mixing with the oxidizing agent explicitly includes the case that, still in the evaporator after it has been completely evaporated, the fuel mixes with the portion of the secondary medium that is not yet reacted without additional oxidizing agent being supplied from the outside.

By spatially separating evaporation and mixing, it is possible to supply exactly enough oxygen to the fuel vapor during mixing so that oxidizing agent and evaporated fuel mix as homogeneously as possible but do not react with one another. A reaction between fuel and oxidizing agent occurs only during the partial oxidation in the evaporator, but not in the area downstream of the evaporator. Furthermore, additional mixing parameters can be optimized in terms of a fuel/oxidizing agent mixture that is ultimately as homogeneous as possible without interfering with the evaporation of the fuel.

The quality of a fuel/air mixture in the sense of reformability to create a hydrogen-rich gas can be measured in the hydrogen yield per unit of primary combustible. Introducing the second stage to the evaporation process reduces the yield at most by 2.5 percent, but as a rule not at all.

In one advantageous embodiment of the invention, of the overall quantity of oxygen supplied to the fuel, a portion between 25 and 100 percent, preferably between 35 and 50 percent, is used for the evaporation.

The overall quantity of oxygen supplied shall be construed to mean the total quantity of oxygen supplied via the secondary medium and via the oxidizing agent.

The fuel is particularly well evaporated with this oxygen distribution, while at the same time a particularly homogeneous fuel/oxidizing agent mixture results after mixing. This leads to complete conversion of the mixture during reforming and suppresses formation of deposits that contain carbon and that would deactivate the catalyst.

In the framework of the invention a mixing chamber was found that has an evaporator and at least one second area connected thereto. This mixing chamber is provided for the complete evaporation of a fuel in accordance with the inventive method and here in particular is provided for producing a fuel/oxidizing agent mixture. It was found that when using this mixing chamber the inventive evaporation and the inventive mixing of the fuel with the oxidizing agent cooperate in a particularly advantageous manner.

The oxidizing agent is advantageously materially the same as the secondary medium used during the evaporation. It can then be supplied to the mixing chamber together with the secondary medium or separately. In the latter case, the second stage of the evaporation and the mixing can be controlled independent of one another, although the same oxidizing agent is used for both purposes. To this end the mixing chamber advantageously has independent nozzles for supplying the secondary medium and for supplying the oxidizing agent.

The nozzles can each be embodied as nozzle rings.

For the evaporation, this causes homogeneous temperature distribution in the secondary evaporation zone. Mixing is more homogeneous because of this measure.

The mixing chamber advantageously has a constriction between the evaporator and the second area. The flow is accelerated in the constriction and thus the turbulence is intensified, which is advantageous for rapid mixing. In addition, this spatially separates the evaporator part from the second area.

DESCRIPTION OF EXEMPLARY EMBODIMENTS

The subject-matter of the invention shall be described in greater detail in the following using figures, but this shall not limit the subject-matter of the invention.

Figure 1:
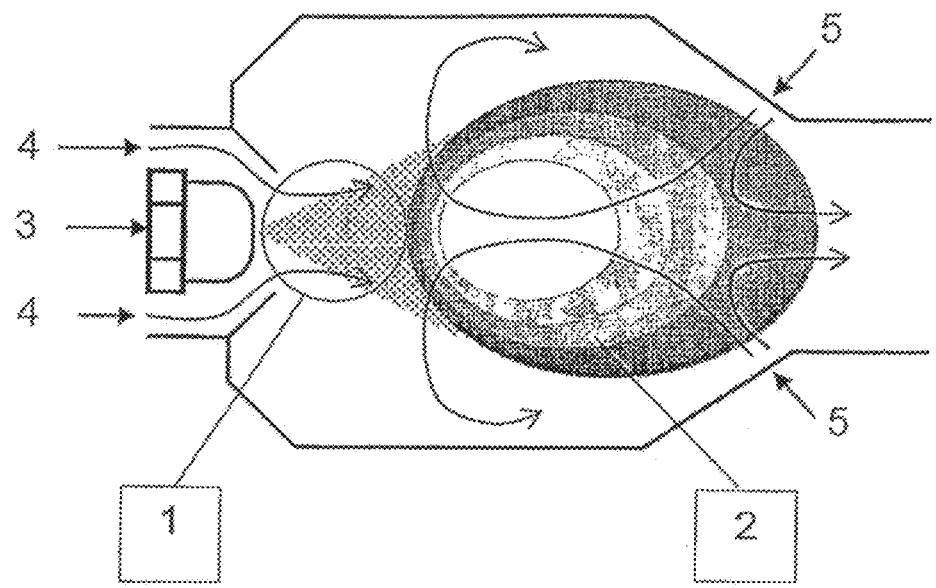
FIG. 1 shows one exemplary embodiment of a device with which the method of the invention can be performed.

FIG. 1 depicts one exemplary embodiment of a device (evaporator) with which the method can be performed. The arrows indicate the typical flow profiles for the substances during operation. The evaporator, including the primary evaporation zone 1 and the secondary evaporation zone 2, contains nozzles for the liquid fuel 3 and for the primary medium 4 that are arranged adjacent to one another. This makes it possible to mix the primary medium 4 with the fuel 3 with particular intensity, the majority being evaporated in the primary evaporation zone 1. The nozzles are also arranged such that during operation the primary medium 4 flows around the nozzle for the fuel 3. This prevents potential precipitation of drops at the nozzle for the fuel 3, which could lead to carbon black forming and to this nozzle becoming clogged.

The nozzles for the secondary medium 5 are arranged such that the secondary medium streams toward the fuel. The substance exit direction for the nozzles and the pressure with which the secondary medium exits from them determine where the secondary evaporation zone 2 is. The evaporated fuel can flow out of the evaporator into a mixing area 6 in which it is mixed with an additional oxidizing 7 agent but does not react therewith.

Figure 2:
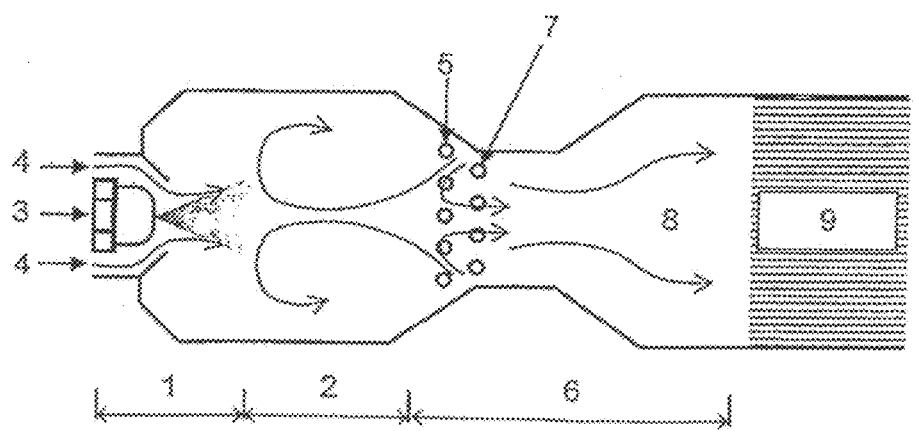
FIG. 2 shows another exemplary embodiment in the form of a mixing chamber.

FIG. 2 depicts another exemplary embodiment of an inventive mixing chamber. The arrows indicate the typical flow profiles for the substances during operation. The second area in which the evaporated fuel is homogeneously mixed with oxidizing agent (mixing area 6) is disposed spatially separated from an inventive evaporator, which includes the primary evaporation zone 1 and the secondary evaporation zone 2, as the first area. Provided between the first area and the second area are a nozzle ring for supplying the first area with secondary medium 5 and another nozzle ring for supplying the second area with oxidizing agent 7. Depicted at the right-hand end of the second area is the catalyst 9 of an autothermal reformer to which the fuel/oxidizing agent mixture 8 produced in the mixing chamber is typically supplied.

Used in one specific embodiment of the invention for evaporation was Aral Ultimate Diesel, which has an $O_2/C$ ratio of 0.47 and $H_2O/C$ ratio of 1.90. When the fuel is evaporated with only the first stage, the downstream reforming yields a dry product gas having 35.7 percent by volume hydrogen. With the inventive two-stage evaporation, the hydrogen concentration in the product gas is reduced to a level that is not measurable at a measuring accuracy of 0.5 percent by volume.

In another specific embodiment of the method, a mixing chamber with a downstream catalyst is used.

This mixing chamber has an inner diameter of 53 mm and a length of 150 mm from the injection nozzle to the catalyst. Air is injected as the oxidizing agent, 30 bores being used for this, each having a 1 mm diameter. The overall arrangement of mixing chamber and catalyst yields sufficient fuel gas for a fuel cell in the 5 kW capacity class. It uses 1.3 kg/h fuel (diesel fuel or kerosene), 5.8 kg/h air, and 3.1 kg/h water.

The invention claimed is:

1. Method for evaporating a liquid fuel comprising the steps of:

in a first stage, partially evaporating between 70 and 90 percent of the entire amount of the fuel in a primary evaporation zone using heat contact with a heated primary medium comprising, superheated steam, whereby an evaporated fuel fraction and an unevaporated fuel fraction are provided;

in a second stage, supplying an oxidizing secondary medium to the fuel in a secondary evaporation zone that is spatially separated from the primary evaporation zone, the secondary medium being at a temperature sufficient to generate an exothermic, oxidation reaction in which the evaporated fuel fraction is oxidized, and employing the heat generated in the exothermic oxidation reaction to evaporate the unevaporated fuel fraction, the unevaporated fuel fraction not undergoing oxidation in the secondary evaporation zone; and interrupting the exothermic oxidation reaction to effect only a partial oxidation of the evaporated fuel fraction.

2. Method in accordance with claim 1, wherein the secondary medium comprises air.

3. Method in accordance with claim 1, wherein the fuel is atomized upstream of the first stage.

4. Method in accordance with claim 1, wherein prior to coming into contact with the fuel, the primary medium has a temperature below 700° C.

5. Method in accordance with claim 1, wherein the secondary medium flows toward the fuel.

6. Method in accordance with claim 1, wherein the temperature of the reaction products after the partial oxidation is 800° C. or less.

7. Method in accordance with claim 1, wherein the fuel
is evaporated and partially oxidized in a first area, and
is mixed with an oxidizing agent in a second area that is separated spatially from the first area.

8. Method in accordance with claim 7, wherein, of the overall quantity of oxygen supplied to the fuel, a portion between 25 and 100 percent is used for the evaporation.

9. Method in accordance with claim 1, wherein prior to coming into contact with the fuel, the primary medium has a temperature below 500° C.

10. Method in accordance with claim 1, wherein the temperature of the reaction products after the partial oxidation is 450° C. or less.

11. Method in accordance with claim 7, wherein, of the overall quantity of oxygen supplied to the fuel, a portion between 35 and 50 percent is used for the evaporation.

12. Method in accordance with claim 7, wherein the fuel is evaporated and partially oxidized in an evaporator.

13. Method for evaporating a liquid fuel comprising the steps of:
partially evaporating the fuel in a primary evaporation zone using heat contact with a heated primary medium, whereby an evaporated fuel fraction and an unevaporated fuel fraction are provided, wherein between 70 and 90 percent of the entire amount of fuel is evaporated;
supplying an oxidizing secondary medium to the fuel in a secondary evaporation zone that is spatially separated from the primary evaporation zone, the secondary medium being at a temperature sufficient to generate an exothermic oxidation reaction in which the evaporated fuel fraction is oxidized, and employing the heat generated in the exothermic oxidation reaction to evaporate the unevaporated fuel fraction not undergoing oxidation in the secondary evaporation zone; and
interrupting the exothermic oxidation reaction to effect only a partial oxidation of the evaporated fuel fraction.

14. Method in accordance with claim 13, wherein the secondary medium comprises air.

15. Method in accordance with claim 13, wherein the fuel is atomized upstream of the primary evaporation zone.

16. Method in accordance with claim 13, wherein prior to coming into contact with the fuel, the primary medium has a temperature below 700° C.

17. Method in accordance with claim 13, wherein the secondary medium flows toward the fuel.

18. Method in accordance with claim 13, wherein the temperature of the reaction products after the partial oxidation is 800° C. or less.

19. Method in accordance claim 13, wherein the fuel
is evaporated and partially oxidized in a first area, and
is mixed with an oxidizing agent in a second area that is separated spatially from the first area.

20. Method in accordance with claim 19, wherein, of the overall quantity of oxygen supplied to the fuel; a portion between 25 and 100 percent is used for the evaporation.

21. Method in accordance claim 13, wherein prior to coming into contact with the fuel, the primary medium has a temperature below 500° C.

22. Method in accordance claim 13, wherein the temperature of the reaction products after the partial oxidation is 450° C. or less.

23. Method in accordance with claim 19, wherein, of the overall quantity of oxygen supplied to the fuel, a portion between 35 and 50 percent is used for the evaporation.

24. Method in accordance with claim 19, wherein the fuel is evaporated and partially oxidized in an evaporator.

* * * * *